United States Patent
Siebenmorgen et al.

(10) Patent No.: US 10,712,553 B2
(45) Date of Patent: Jul. 14, 2020

(54) ASSEMBLY FOR LIGHT SHEET MICROSCOPY

(71) Applicant: Carl Zeiss Microscopy GmbH, Jena (DE)

(72) Inventors: Jörg Siebenmorgen, Jena (DE); Thomas Kalkbrenner, Jena (DE); Helmut Lippert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 317 days.

(21) Appl. No.: 14/904,067

(22) PCT Filed: Jul. 8, 2014

(86) PCT No.: PCT/EP2014/064551
§ 371 (c)(1),
(2) Date: Jan. 8, 2016

(87) PCT Pub. No.: WO2015/004108
PCT Pub. Date: Jan. 15, 2015

(65) Prior Publication Data
US 2016/0154236 A1    Jun. 2, 2016

(30) Foreign Application Priority Data

Jul. 10, 2013   (DE) .................. 10 2013 107 297

(51) Int. Cl.
*G02B 27/00* (2006.01)
*G02B 21/16* (2006.01)
(Continued)

(52) U.S. Cl.
CPC ......... *G02B 27/0025* (2013.01); *G01N 21/15* (2013.01); *G02B 21/0032* (2013.01);
(Continued)

(58) Field of Classification Search
CPC ...... G01B 9/04; G02B 21/00; G02B 21/0008; G02B 21/24; G02B 21/368; G02B 21/364;
(Continued)

(56) References Cited

U.S. PATENT DOCUMENTS 5,969,854 A * 10/1999 Stelzer ............... G02B 21/0024
359/368
6,137,631 A * 10/2000 Moulin ............... G02B 27/0994
359/618

(Continued)

FOREIGN PATENT DOCUMENTS

DE          102 57 423       6/2004
DE       10 2007 018862     10/2008
(Continued)

OTHER PUBLICATIONS

Fast Neuronal Imaging using Objective Coupled Planar Illumination Microscopy, Touriga.*

(Continued)

*Primary Examiner* — Thomas K Pham
*Assistant Examiner* — Alberto J Betancourt
(74) *Attorney, Agent, or Firm* — Haug Partners LLP

(57) ABSTRACT

An arrangement, for light sheet microscopy, including: a sample vessel, for receiving a medium containing a sample, oriented with respect to a plane reference surface; illumination optics with an illumination objective for illuminating the sample with a light sheet; and detection optics with a detection objective. The optical axis of the illumination objective and the light sheet lies in a plane which forms a nonzero illumination angle with the normal of the reference surface. The detection objective has an optical axis that forms a nonzero detection angle with the normal of the reference surface. The arrangement also includes a separat- (Continued)

ing-layer system for separating the sample-containing medium from the illumination and detection objectives. The separating-layer system contacts the medium with an interface parallel to the reference surface. The illumination angle and detection angle are predetermined based on numerical apertures of the detection objective and of the illumination objective, respectively.

11 Claims, 3 Drawing Sheets

(51) Int. Cl.
| | | |
|---|---|---|
| *G02B 21/36* | (2006.01) | |
| *G02B 21/00* | (2006.01) | |
| *G02B 21/34* | (2006.01) | |
| *G01N 21/15* | (2006.01) | |
| *G02B 21/02* | (2006.01) | |
| *G02B 21/33* | (2006.01) | |
| *G01N 21/03* | (2006.01) | |

(52) U.S. Cl.
CPC ..... *G02B 21/0076* (2013.01); *G02B 21/0088* (2013.01); *G02B 21/02* (2013.01); *G02B 21/16* (2013.01); *G02B 21/33* (2013.01); *G02B 21/34* (2013.01); *G02B 21/367* (2013.01); *G02B 27/0068* (2013.01); *G01N 2021/0396* (2013.01)

(58) Field of Classification Search
CPC ............... G02B 21/0056; G02B 21/14; G02B 21/0068; G02B 21/0092; G02B 21/18; G02B 21/22; G02B 21/0016; G02B 21/20; G02B 27/0025; G02B 27/0068; G02B 21/33; G02B 21/02; G02B 21/0088; G02B 21/0032; G02B 21/367; G02B 21/34; G02B 21/16; G02B 21/0076; A61B 90/37; A61B 90/36; A61B 1/00197; G01N 21/15; G01N 2021/0396
USPC .................................................. 359/368–398
See application file for complete search history.

(56) References Cited

U.S. PATENT DOCUMENTS

| | | | | |
|---|---|---|---|---|
| 2009/0174937 A1* | 7/2009 | Holy | ........................ | G02B 21/08 359/382 |
| 2009/0231689 A1* | 9/2009 | Pittsyn | ...................... | G01B 9/04 359/363 |
| 2010/0134881 A1* | 6/2010 | Lippert | ................... | G02B 21/33 359/381 |
| 2010/0142038 A1* | 6/2010 | Sugiura | ................. | G02B 21/082 359/381 |
| 2010/0177381 A1* | 7/2010 | Lippert | ................... | G02B 21/26 359/398 |
| 2011/0006231 A1* | 1/2011 | Betzig | ................... | G02B 21/361 359/383 |
| 2011/0122646 A1* | 5/2011 | Bickham | .............. | G02B 6/0003 362/554 |
| 2011/0304723 A1* | 12/2011 | Betzig | ................ | G02B 21/0004 359/385 |
| 2012/0099190 A1* | 4/2012 | Knebel | ................... | G02B 21/16 359/385 |
| 2012/0206798 A1* | 8/2012 | Knop | .................... | G02B 21/002 359/385 |
| 2012/0320438 A1* | 12/2012 | Knebel | .............. | G02B 21/0032 359/205.1 |
| 2013/0288286 A1* | 10/2013 | Sugiyama | .............. | G02B 21/14 435/29 |
| 2016/0070091 A1* | 3/2016 | Hufnagel | ........... | G02B 21/0076 359/385 |

FOREIGN PATENT DOCUMENTS

| | | |
|---|---|---|
| DE | 20 2011 110 077 | 1/2013 |
| DE | 20 2012 007 891 | 1/2013 |
| DE | 10 2011 054 914 | 5/2013 |
| DE | 10 2012 109 577 | 5/2013 |
| EP | 0 866 993 | 9/1998 |
| EP | 2 535 754 | 12/2012 |
| WO | WO 2004/053558 | 6/2004 |
| WO | WO 2012/094523 | 7/2012 |
| WO | WO 2012/110488 | 8/2012 |
| WO | WO 2012/122027 | 9/2012 |

OTHER PUBLICATIONS

Light Sheet Fluorescence Microscopy, Nikon; https://www.microscopyu.com/techniques/light-sheet/light-sheet-fluorescence-microscopy.*
Notification of Transmittal of Copies of Translation of the International Preliminary Report on Patentability for PCT/EP2014/064551 dated Jan. 12, 2016.
Diwakar Turaga: "Fast Neuronal Imaging using Objective Coupled Planar Illumination Microscopy", Electronic Theses and Dissertations. Paper 652, Jan. 1, 2012 (Jan. 1, 2012), XP055142051, Gefunden im Internet: URL:http://openscholarship.wustl.edu/etd/652/ [gefunden am Sep. 23, 2014].
Y. Wu et al., "Inverted selective plane illumination microscopy (iSPIM) enables coupled cell identity lineaging and neurodevelopmental imaging in Caenorhabditis elegans", Proceedings of the National Academy of Sciences, Bd. 108, Nr. 43, Oct. 25, 2011 (Oct. 25, 2011), Seiten 17708-17713, XP055089764, ISSN: 0027-8424, DOI: 10.1073/pnas.1108494108.
"Selective Plane Illumination Microscopy Techniques in Developmental Biology" by J. Huisken et al., published in 2009 in the journal *Development*, vol. 136, p. 1963.
"Optical thin-film materials with low refractive index for broadband elimination of Fresnel reflection", by J.-Q. Xi et al., Published in 2007 in *Nature Photonics*, vol. 1, pp. 176-179.
International Search Report for Application No. PCT/EP2014/064551 dated Oct. 1, 2014.
German Search Report dated Jun. 30, 2014.

* cited by examiner

ASSEMBLY FOR LIGHT SHEET MICROSCOPY

The present application claims priority from PCT Patent Application No. PCT/EP2014/064551 filed on Jul. 8, 2014, which claims priority from German Patent Application No. DE 10 2013 107 297.6 filed on Jul. 10, 2013, the disclosures of which are incorporated herein by reference in their entirety.

FIELD OF THE INVENTION

It is noted that citation or identification of any document in this application is not an admission that such document is available as prior art to the present invention.

The invention is directed to an arrangement for light sheet microscopy. An arrangement of this kind includes a sample vessel for receiving a sample that is located in a medium, this sample vessel being oriented with respect to a plane reference surface. The arrangement further includes illumination optics with an illumination objective for illuminating the sample with a light sheet, and the optical axis of the illumination objective and the light sheet lie in a plane which forms an illumination angle $\beta$ not equal to zero with the normal of the reference surface. Finally, the arrangement comprises detection optics with a detection objective having an optical axis which forms a detection angle $\delta$ not equal to zero with the normal of the reference surface. The illumination objective and detection objective can also be configured as a so-called double-objective such as is described, for example, in EP 0 866 993 B1. In this case, the two objectives are put together in a shared constructional unit, and the respective optics—i.e., objectives with associated beam paths and optical elements arranged therein—share some elements.

An apparatus of this type is used particularly in the examination of biological samples in which the sample is illuminated by a light sheet, the plane of which intersects the optical axis of detection at an angle not equal to zero. The light sheet typically forms a right angle with the detection direction which generally corresponds to the optical axis of the detection objective. Spatial recordings of even thick samples can be made relatively quickly with this technique, also referred to as SPIM (selective plane illumination microscopy). A graphic, spatially extensive representation of the sample is made possible based on optical sections combined with a relative movement in a direction perpendicular to the section plane.

The SPIM technique is preferably used in fluorescence microscopy, where it is accordingly also referred to as LSFM (light sheet fluorescence microscopy). The LSFM technique has a number of advantages over other established methods such as confocal laser scanning microscopy or two-photon microscopy. Since widefield detection is carried out, larger sample regions can be acquired. Although the resolution is somewhat lower than in confocal laser scanning microscopy, the LSFM technique can be used to analyze thicker samples because the penetration depth is greater. Further, this method has the least light stress on the samples, which, among other things, reduces the risk of photobleaching of a sample because the sample is only illuminated by a thin light sheet at an angle to the detection direction not equal to zero.

Both a static light sheet generated, for example, by cylindrical lenses, and a quasistatic light sheet can be used for this purpose. This light sheet can be generated through fast scanning of the sample with a light beam. The light sheet-type illumination is brought about in that the light beam undergoes a very fast relative movement with respect to the sample to be observed and is thus strung together over and over in a temporally consecutive manner. The integration time of the camera on whose sensor the sample is ultimately imaged is selected such that the scanning is concluded within the integration time. Instead of a camera with a two-dimensional array, a line sensor combined with a renewed scanning (rescan) can also be used in the detection optics. Further, confocal detection can also be carried out.

The SPIM technique has been described many times in the literature, for example, in DE 102 57 423 A1 and in WO 2004/053558 A1 which is based on the latter, or in the survey article "Selective Plane Illumination Microscopy Techniques in Developmental Biology" by J. Huisken et al. published in 2009 in the journal *Development*, vol. 136, p. 1963.

One of the chief applications of light sheet microscopy is for imaging intermediate-sized organisms having a size of some hundreds of micrometers to a few millimeters. Generally, these organisms are embedded in an agarose gel which is located in turn in a glass capillary. The glass capillary is inserted from above or below into a sample chamber filled with water, and the sample is pushed some distance out of the capillary. The sample in the agarose is illuminated by a light sheet and the fluorescence is imaged on a camera by a detection objective oriented perpendicular to the light sheet and, therefore, also perpendicular to the light sheet optics. This method of light sheet microscopy has three sizable disadvantages. For one, the samples to be examined are relatively large and derive from developmental biology. Further, because of the sample preparation and the dimensions of the sample chamber, the light sheet is relatively thick and accordingly limits the attainable axial resolution. In addition, the sample preparation is complicated and is not compatible with standardized sample preparations or standardized sample holders such as are conventionally used in fluorescence microscopy for examining individual cells.

In order to circumvent these limitations at least partially, a SPIM construction was recently implemented in which the illumination objective and the detection objective are perpendicular to one another and are directed onto the sample from above at an angle of 45° in each instance. When, for example, the plane of a stage on which the sample holder is mounted or some other horizontal plane is used as reference surface, the illumination angle $\beta$ and the detection angle $\delta$ are both 45°. A construction of this kind is described, for example, in WO 2012/110488A2 and WO2012/122027A2.

In constructions such as these, the sample is located, for example, on the bottom of a petri dish. The petri dish is filled with water, the illumination objective and detection objective are immersed in the liquid, and the water also takes on the function of an immersion liquid. This approach offers the advantage of higher resolution in axial direction, since a thinner light sheet can be generated. Smaller samples can then be examined owing to the higher resolution. Sample preparation is also made significantly easier. Nevertheless, the sample preparation and sample holder still do not correspond to the standard currently applicable in fluorescence microscopy with individual cells. Accordingly, the petri dish must be relatively large so that the two objectives can be immersed in the dish without hitting the edge of the dish. Microtiter plates—also known as multi-well plates—which are standard in many branches of biology and are also used precisely in fluorescence microscopy analysis of individual cells cannot be used with this method because the objectives cannot be immersed in the very small wells arranged in grid shape on the plate. A further disadvantage consists in that it is not readily possible with this construction to analyze a large number of samples in a short period of time (high-throughput screening) because the objectives must be cleaned when changing samples in order to avoid contaminating the different samples.

SUMMARY OF THE INVENTION

Therefore, it is the object of the invention to further develop an arrangement for light sheet microscopy of the type described in the introduction such that the analysis of a large number of samples in particular is facilitated by efficiently preventing cross-contamination when changing from one sample to another.

In an arrangement for light sheet microscopy of the type described in the introduction, the above-stated object is met in that this arrangement includes a separating layer system with one or more layers of predetermined thickness and made of predetermined materials for spatially separating the medium in which the sample is found from the illumination objective and the detection objective. In so doing, at least in the region which is accessible to the illumination objective and the detection objective for illuminating the sample and detecting light coming from the sample, respectively, the separating layer system contacts the medium—completely or at least virtually completely—with an interface which is oriented parallel to the reference surface. The illumination angle β and detection angle δ are predetermined based on the numerical aperture $NA_D$ of the detection objective and on the numerical aperture $NA_B$ of the illumination objective. The predetermination is carried out such that the components are arranged with respect to one another in such a way that the existing aberrations are minimal without further action. Of course, other angles can also be adjusted at the expense of larger aberrations, but this reduces the imaging quality.

In the simplest case, the separating layer system comprises only one individual layer, which layer can also be an air layer, in which case the illumination objective and detection objective are configured as dry objectives. However, the separating layer system can also include a plurality of layers, for example, a glass layer or plastic layer, which covers the sample vessel vis-a-vis the two objectives as a sheet or plate. In this case, an air layer or a layer with an immersion liquid with which the two objects are in contact is located between this glass layer or plastic layer and the objectives. However, the separating layer system can also comprise an individual liquid layer if it is ensured that this liquid layer does not mix with the medium in which the sample is located. This liquid can then also serve as an immersion medium.

Although contamination can be efficiently prevented through the introduction of a separating layer system, extreme imaging aberrations such as spherical aberrations and coma occur even at low numerical apertures of 0.3 because of the passage of illumination light and detection light through the interfaces of the separating layer system to the medium in which the sample is located. Because of this oblique passage, additional, asymmetrical imaging aberrations are added or the other imaging aberrations are amplified. Therefore, in order to minimize these imaging aberrations, the illumination angle β and the detection angle δ are predetermined based on the numerical apertures $NA_D$, $NA_B$ of the detection objective and illumination objective, respectively. In this respect, the objective with the lower numerical aperture, generally the illumination objective, is arranged at a greater angle than the detection objective. In isolated instances, the detection objective can also have a higher numerical aperture than the illumination objective. Symmetrical configurations are also often used, where the illumination objective and detection objective are constructed identically and the two objectives form the same angle with the normal. Ideally, the sum of the illumination angle β and detection angle δ is 90° in all cases. If this angle is deviated from, for example, because the two objectives can be arranged at a more acute angle so that the sum is less than 90°, then, as the object plane is now askew in relation to the optical axis of the detection objective, it must be ensured that the Scheimpflug condition is met—the image sensor of the camera must then also be oriented obliquely in a corresponding manner. Arrangements in which the illumination objective and detection objective are placed together in an optical module like the double-objective mentioned earlier are also conceivable.

If this type of simple minimization of aberrations which can be performed with standardized objectives should turn out to be insufficient, further steps are possible to further prevent or entirely eliminate the aberrations.

Therefore, in a preferred configuration of the invention, the illumination optics and/or detection optics include corrective means for reducing aberrations, particularly aberrations arising as a result of the oblique passage of illumination light and/or the light to be detected through interfaces of the separating layer system.

Therefore, in a preferred embodiment, the corrective means include corrective lenses and/or corrective elements in the illumination objective or in the detection objective. The corrective lenses can be configured, for example, as cylindrical lenses, as lenses which are tilted relative to the respective optical axis, or as lenses which are not arranged axially, i.e., whose axis of symmetry does not lie on the optical axis of the illumination objective or detection objective. The corrective elements can be configured as elements with aspherical surfaces or free-form surfaces, for example. Various corrective lenses and/or corrective elements of one type or of different types can also be combined in an objective.

Depending on the material composition and the thickness of the separating layer system, each separating layer system can have its own set of illumination objectives and detection objectives; however, this entails a high cost as a plurality of sets must be provided and also entails increased labor as the objectives must be changed when changing the separating layer system.

Therefore, in an alternative embodiment, the corrective means comprise adaptive optical elements which are arranged in the illumination beam path and/or in the detection beam path for manipulating the phase fronts of the illumination light and detection light, respectively. These adaptive optical elements can be configured, for example, as deformable mirrors, phase plates or spatial light modulators. These elements can preferably be configured so as to be controllable such that it is possible to adapt to a variety of possible separating layer systems with one and the same arrangement of illumination objective and detection objective.

It is also conceivable to combine the two alternatives in such a way that a key basic correction for the most commonly used separating layer systems and also possibly for spherical aberrations in case of perpendicular passage—as is often the case in microscope objectives for standard glasses and standard thicknesses—is carried out, for example, through the fixed corrective lenses, and an individual fine correction which is adapted to the respective separating layer system is carried out by means of the adaptive optical elements in the beam path.

As has already been mentioned, the separating layer system preferably comprises a plate-shaped or sheet-shaped covering which covers the sample vessel and is made of a predetermined material and has a predetermined thickness. A first large surface of this plate-shaped or sheet-shaped covering is in virtually complete contact with the medium in which the sample is located at least in the region that is accessible to the illumination objective and detection objective for illumination and detection. A second large surface of the covering is preferably in contact with a gas, for example, air, or an immersion medium as further component of the separating layer system at least in the region that is accessible to the illumination objective and detection objective for illumination and detection. Alternatively or in addition to the above-mentioned corrective means in the objectives or in the beam path, the separating layer system can also be correspondingly adapted to prevent aberrations. When the separating layer materials are adapted in a corresponding manner, a more extensive correction of the objectives can also be dispensed with under circumstances, or these corrections need not be as drastic.

Therefore, in a preferred embodiment of the invention, the material for the covering has a refractive index that differs by less than 5% from the refractive index of the medium in which the sample is located. When both materials have the same refractive index, aberrations can be completely prevented at the interface between the medium and covering. For example, when water, which has a refractive index $n_d$=1.33 at a wavelength $\lambda_d$=578.56 nm, is used as medium in which the sample is located, examples of suitable materials for the covering are PTFE (polytetrafluoroethylene, $n_d$=1.35), CYTOP® ($n_d$=1.34) or FEP (fluorinated ethylene propylene, $n_d$=1.34). Perfluorodioxolane polymers which likewise have a refractive index generally between 1.33 and 1.36 can also be used. Teflon® AF which usually has a refractive index $n_d$=1.32 is also a particularly well-suited material This material is an amorphous polymer. In this case, the glass transition temperature can be adjusted in such a way that the polymer in cooled state has the refractive index of the medium in which the sample is located. Other amorphous polymers having an adjustable glass transition temperature can also be used, of course.

If the refractive indices do not coincide exactly, aberrations continue to occur, although to a lesser degree. To further prevent these aberrations, the separating layer or covering should be as thin as possible and should be no thicker than some hundreds of micrometers. If the covering serves simultaneously as the bottom of the sample vessel, as is the case with an inverted arrangement, or as side wall in case of a horizontal observation arrangement, a sufficient stability must, of course, be ensured with respect to the pressure exerted by the medium in which the sample is located. This is not necessary when the covering serves as cover of the sample vessel for upright observation. In this case, the material can be substantially thinner with thicknesses of less than 100 µm.

In a further embodiment of the invention, the material for the covering is a nanostructured material composed of a first component and a second component, where the refractive index of the first component is less than the refractive index of the medium for receiving the sample, and the refractive index of the second component is greater than the refractive index of the medium for receiving the sample. With corresponding nanostructuring of the second component with proportions of the first component or, given suitable materials, also only by mixing a ratio of the two components, a material with an effective refractive index in the aforementioned range of 5% around the refractive index of the medium for receiving the sample can be produced. However, in case of nanostructuring, it is stipulated that the mean structure sizes of the regions of material of the first component have a diameter that is less than the light wavelengths of the light which is to be used for illumination and which is to be detected, since only then can an effective refractive index be adjusted in a range of 5% around the refractive index of the medium, for example, water. In this case, for example, different polymers can be used which have mixing and demixing properties that can be utilized in case the materials do not mix, or nanoporous silicon dioxide can also be used. In the latter case, the first component is air and the second component is silicon dioxide. These kinds of nanostructured materials are described in connection with the production of antireflective layers, for example, in the article "Optical thin-film materials with low refractive index for broadband elimination of Fresnel reflection", by J.-Q. Xi et al., published in 2007 in *Nature Photonics*, Vol. 1, pages 176-179. In this case also, the selected thickness of the covering should be as small as possible given the same constraints as those described above.

The separating layer system, including the covering, can comprise, for example, a vessel cover for conventional microtiter plates, in which case the known upright configuration of a light sheet microscope can be used. In this case, it is ensured by corresponding positioning means for positioning the sample in the top one fourth of the sample vessel with respect to depth, or for positioning in the vessel cover, that the sample is accessible to the microscope construction.

However, the arrangement for light sheet microscopy can also comprise an inverted light sheet microscope in which the illumination objective and detection objective are arranged below the sample vessel. In this case, the covering, as part of the separating layer system, forms the bottom of the sample vessel, i.e., special sample vessels must be stocked or standardized multi-well plates with transparent vessel bottoms.

Further, a horizontal configuration in which the optical axes of the illumination objective and detection objective lie in a horizontal plane is also possible. In this case and in the case of upright observation, the sample vessel advisably comprises means for positioning the sample in a side region or upper region of the sample vessel within the working distance of the illumination objective and detection objective.

It will be appreciated that the features mentioned above and those to be described hereinafter can be used not only in the indicated combinations but also in other combinations or individually without departing from the scope of the present invention.

The invention will be described more fully in the following by way of example with reference to the accompanying drawings which also disclose key features of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
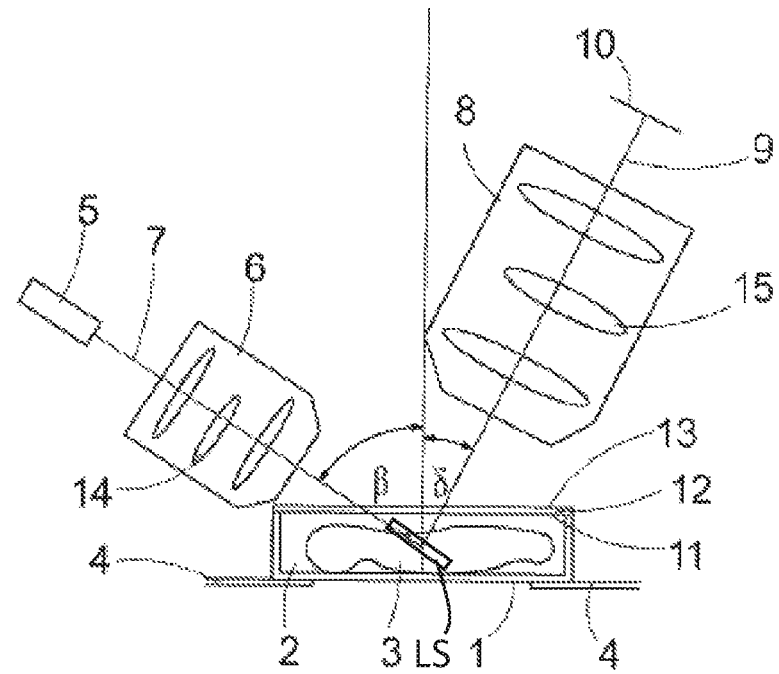
FIG. 1 shows a first arrangement for light sheet microscopy with upright observation.

First, FIG. 1 shows an arrangement for light sheet microscopy that is suitable for upright observation. This arrangement comprises a sample vessel 1 for receiving a sample 3 located in a medium 2. The sample vessel 1 is oriented with respect to a plane reference surface which is defined in this case by a specimen stage 4. The arrangement includes illumination optics with a light source 5 and an illumination objective 6 for illuminating the sample 3 with a light sheet "LS", and the optical axis 7 of the illumination objective 6 and the light sheet lie in a plane which forms an illumination angle $\beta$ not equal to zero with the normal of the reference surface. The arrangement further comprises detection optics with a detection objective 8 having an optical axis 9 which forms a detection angle $\delta$ not equal to zero with the normal of the reference surface. Light coming from the sample 3 is directed to and registered on a detector 10; the registered signals are made available for further processing and/or for displaying on a screen.

The arrangement further comprises a separating layer system having a layer or a plurality of layers of predetermined thickness and made from predetermined materials for spatially separating the medium 2 in which the sample 3 is located from the illumination objective 6 and detection objective 8. The separating layer system has an interface 11 which is oriented parallel to the reference surface and by which it makes complete contact with, or at least virtually complete contact with, the medium 2 at least in the region that is accessible to the illumination objective 6 and the detection objective 8 for illumination and detection. Illumination angle $\beta$ and detection angle $\delta$ are predetermined on the basis of numerical apertures $NA_D$ and $NA_B$ of the detection objective 8 and illumination objective 6, respectively.

Water, for example, can be used as medium 2, but it is also possible to use other liquids or even gels.

Since the illumination objective 6 and detection objective 8 are no longer in direct contact with the medium 2, contamination can no longer occur when switching between two sample vessels with different samples. However, because of the passage of light through the interfaces, aberrations, particularly spherical aberrations and coma, can occur through the separating layer system which can comprise a layer of air in the simplest instance. Various steps are possible for reducing or entirely preventing these aberrations which—in case of oblique passage of light—consist primarily of astigmatism and coma, also of higher orders to a slight extent.

A first step which is not absolutely necessary can be to define the illumination angle $\beta$ and the detection angle $\delta$ based on the numerical apertures of the illumination objective 6 and detection objective 8. This is also shown in FIG. 1. The numerical aperture $NA_B$ of the illumination objective 6 is smaller than the numerical aperture $NA_D$ of the detection objective 8. Since the aberrations are more noticeable in objectives with a higher numerical aperture, it is advantageous to position the optical axis of such objectives as close as possible to the normal of the reference surface, i.e., at an especially small angle relative to the latter, because the aberrations are also greater the more oblique the light incidence, the greater the angle formed by the optical axis of the objective with the normal of the reference surface. On the other hand, an objective with a smaller numerical aperture can be used for illumination because numerical apertures of less than 0.5 are generally sufficient for generating a light sheet, whereas the highest possible numerical aperture of 1.0 or more is necessary for detection because of the high resolution. In the situation depicted in FIG. 1, the numerical aperture $NA_B$ of the illumination objective 6 is smaller than the numerical aperture $NA_D$ of the detection objective 8. Therefore, the selected illumination angle $\beta$ can be greater than the detection angle $\delta$. In this connection, as is also shown in FIG. 1, the sum of the illumination angle $\delta$ and detection angle $\delta$ is preferably 90°. With angles deviating from 90°, the detector 10 must be correspondingly tilted so that the Scheimpflug condition is met.

The separating layer system has a plate-shaped covering 12 which covers the sample vessel, is made of a predetermined material and has a predetermined thickness. A first large surface of the plate-shaped covering 12 which here coincides with interface 11 contacts the medium 2 at least in the region that is accessible to the illumination objective 6 and the detection objective 8 for illumination and detection. A second large surface 13 of the covering 12 is here in contact with a gas, e.g., air, and forms a further interface. Instead of gas, an immersion medium can also be used as further component of the separating layer system, which immersion medium is in contact with the second large surface 13 of the covering, also at least in the region accessible to the illumination objective 6 and detection objective 8 for illumination and for detection, respectively. The second large surface 13 also acts as an interface and is also occasionally so designated in the following.

Owing to the fact that the illumination objective 6 and the detection objective 8 are oriented with respect to angle to the normal of the reference surface, the aberrations arising particularly through the oblique passage of light through the interfaces can be minimized to a certain extent but are still severe enough to necessitate further correction for detailed recordings particularly at high numerical apertures for detection. Therefore, the illumination optics and/or detection optics include corrective means for reducing aberrations of this kind which arise as a result of the oblique passage of illumination light and/or of light to be detected through interfaces 11, 13 of the separating layer system.

These corrective means can comprise, for example, corrective lenses and/or corrective elements in the illumination objective 6 and/or in the detection objective 8. The corrective lenses can be configured, for example, as cylindrical lenses, as lenses which are tilted relative to the optical axis, and/or as lenses which are not arranged axially, and/or as corrective elements with aspherical surfaces or free-form surfaces. By way of example, FIG. 1 shows in the illumination objective 6 a lens 14 which is not arranged axially and in the detection objective 8 an off-axis lens 15.

An arrangement for light sheet microscopy shown in FIG. 2 has components which are similar to those in FIG. 1 with the difference that in this case the illumination objective 6 and detection objective 8 are arranged below the sample vessel 1; i.e., this arrangement is for inverted light sheet microscopy. In this case, the covering 12 is formed by the bottom of the sample vessel 1. An inverted arrangement of this type is also particularly suitable for analysis of samples in microtiter plates because the samples are located as a rule at the bottom of the vessel due to gravity so that they are more easily accessible in an inverted configuration than in an upright configuration, since the wells are designed very compactly and can be observed only with difficulty from above. Therefore, when the illumination objective 6 and detection objective 8 are arranged above the sample vessel 1, it is advisable to use sample vessels 1 having means for positioning the sample 3 in the upper region of the sample vessel 1 so that the sample 3 is also accessible from above.

Figure 2:
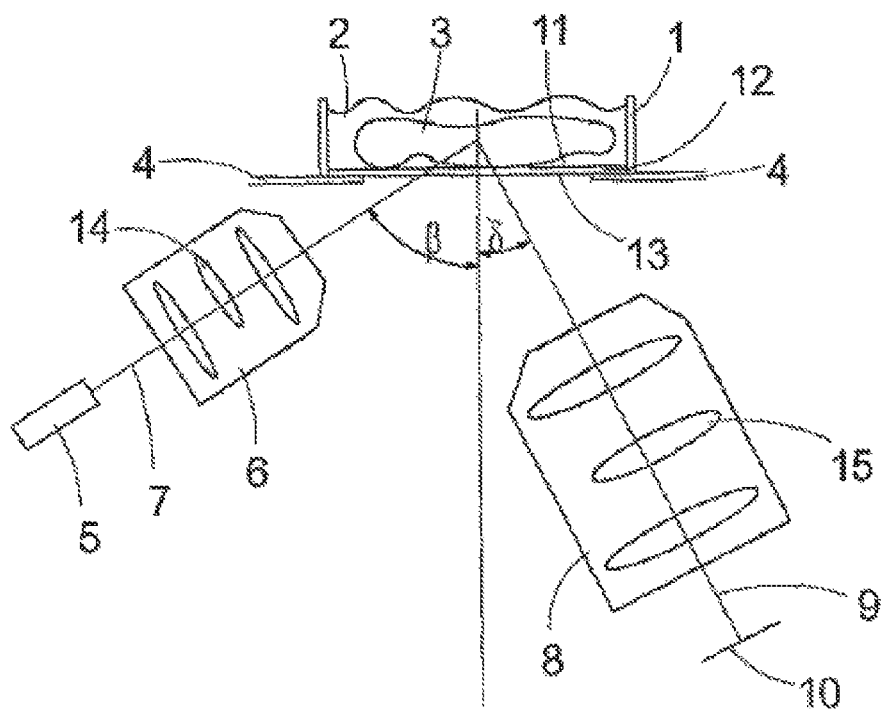
FIG. 2 shows an arrangement for light sheet microscopy like that in FIG. 1, but for inverted observation.
Figure 3:
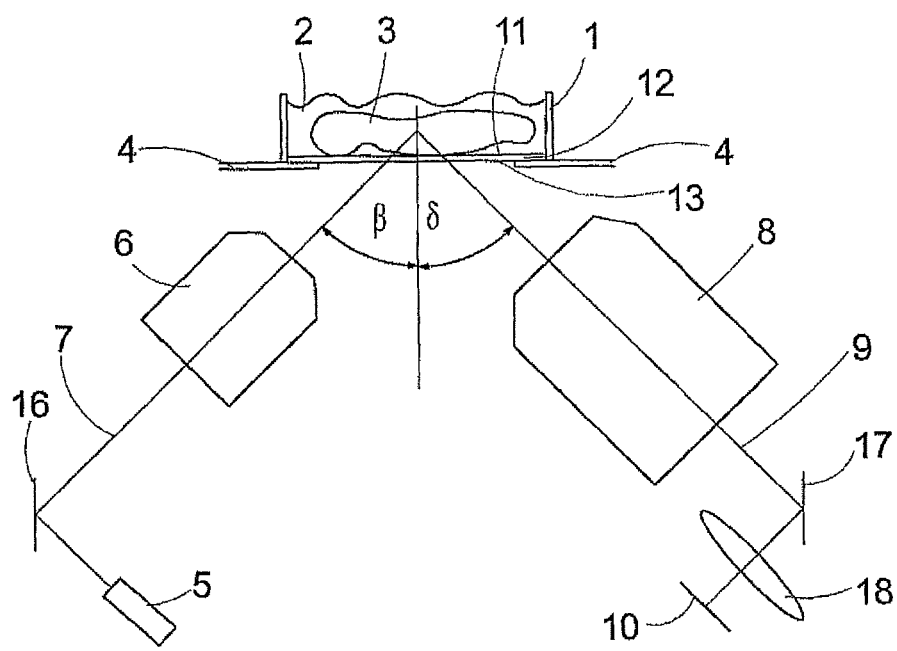
FIG. 3 shows an arrangement for light sheet microscopy with corrective means arranged in the beam path.
Figure 4:
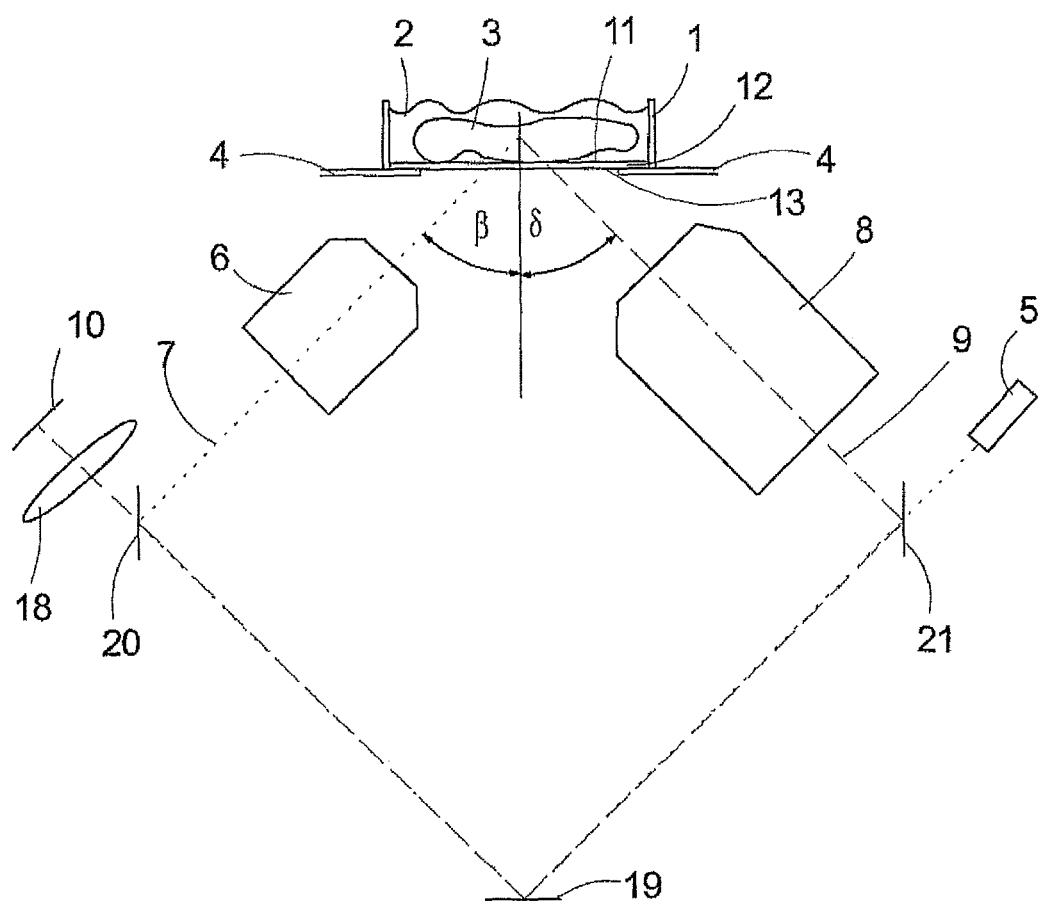
FIG. 4 shows an alternative arrangement with corrective means for compensating the imaging aberrations in the beam path.

In further configurations of the arrangement for light sheet microscopy which are depicted in FIGS. 3 and 4, the arrangement comprises corrective means which are arranged in the illumination beam path and/or in the detection beam path and which are adaptive optical elements for manipulating the phase fronts of the illumination light and detection light. Deformable mirrors, spatial light modulators or phase plates are preferably used as adaptive optical elements. Of course, these corrective means can be combined with corrected objectives as are shown in FIGS. 1 and 2. FIGS. 3 and 4 show only the inverted configuration of the arrangement for light sheet microscopy. In an equivalent manner with reference to FIGS. 1 and 2, a construction in which the illumination objective 6 and detection objective 8 are arranged above the sample vessel 1 can also easily be formed. A horizontal arrangement in which the optical axis 7 of the illumination objective 6 and the optical axis 9 of the detection objective 8 lie in a horizontal plane and the reference surface is oriented vertically can also be realized. An inclined arrangement is also conceivable in principle.

FIG. 3 shows an arrangement similar to the construction in FIG. 2. A sample 3 is mounted in a sample vessel 1 which is arranged on a specimen stage 4. The sample is located in a medium 2, for example, water. For the sake of simplicity and only by way of example, illumination objective 6 and detection objective 8 are configured identically in this case and can therefore be arranged at an angle of 45°, respectively, to the normal of the reference surface. A deformable mirror 16 is arranged in the illumination beam path and a deformable mirror 17 on which the light to be detected impinges before being imaged on the detector 10 via a lens 18 is arranged in the detection beam path. The deformable mirrors 16 and 17, which can also be replaced in these positions by spatial light modulators or phase plates, are controllable and can accordingly be adapted to different illumination angles β and detection angles δ as well as to different objective configurations and different separating layer systems, particularly different coverings 12. In this way, the aberrations can be virtually completely corrected. Further, deformable mirrors and spatial light modulators can be used in addition to correct aberrations that are brought about through the sample.

FIG. 4 shows a somewhat simplified construction in which the illumination objective 6 and detection objective 8 are constructed identically and the illumination angle β and detection angle δ are likewise identical, but in which it is sufficient to use only one deformable mirror 19. For this purpose, a beamsplitter 20 is arranged upstream of the light source 5, which beamsplitter 20 is transparent to the illumination wavelength range and is configured to reflect the wavelengths of fluorescent light to be detected. A beamsplitter 21 which is in turn transparent for the detection wavelength range to be detected but which is configured to be reflective for the illumination wavelength range is also arranged in front of the detector 10. The arrangement can be produced economically by omitting a deformable mirror.

A further possibility for reducing or preventing aberrations which can be combined with the above-mentioned possibilities of corrective means in the beam paths or in the objectives consists in selecting a material for the covering 12 that has a refractive index differing by less than 5% from the refractive index of the medium 2 in which the sample 3 is embedded. In this way, the aberrations are already sharply reduced and the corrective means need no longer play such a drastic role in the beam path as they would if such a step were not taken. This makes production simpler and more economical in that, for example, aspherical lenses can also be used instead of free-form surfaces. If water, for example, is used as medium 2 in which the sample 3 is located, PTFE, CYTOP®, Teflon® AF or a perfluorodioxolane polymer, for example, can be used as material for the covering 12. If an amorphous polymer such as Teflon® AF is used, its glass transition temperature is preferably adjusted in such a way that the polymer in cooled state has the refractive index of the medium 2 in which the sample 3 is located.

If water is also used as immersion medium on the other side of the covering 12, aberrations when light passes through the interfaces can be completely prevented if the refractive indices are identical or differ only in the range of a tenth of a percent.

Finally, another possibility for reducing or preventing the occurrence of aberrations consists in using a nanostructured material comprising a first component 22 and a second component 23 as material for the covering 12. The refractive index of the first component 22 is less than the refractive index of the medium 2 for receiving the sample, and the refractive index of the second component 23 is greater than the refractive index of the medium 2 for receiving the sample 3. A nanostructured material having an effective refractive index that differs from the refractive index of the medium 2 by less than 5% can be produced from these two components 22 and 23. A prerequisite for this is that the mean structure sizes or mean diameters of regions comprising the first component 22 in the nanostructured material are smaller than the light wavelength of the light which is to be used for illumination and which is to be detected. In simplest approximation, the effective refractive index is given by the volume ratio of the two components. In case water, which has a refractive index $n_d$=1.33, is used as medium 2 for receiving the sample 3, air is particularly suited as first component 22, which makes it possible to use nanoporous materials.

Figure 5:
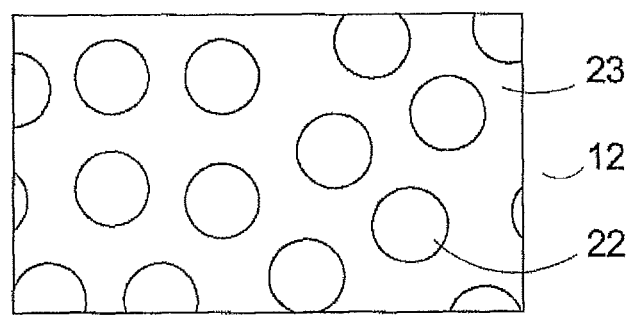
FIG. 5 shows an example of a nanostructured covering.

An example of a nanostructured material of the type mentioned above, nanostructured silicon dioxide, is shown in FIG. 5, which depicts a highly enlarged section of a covering 12 which can form the vessel bottom or the vessel cover, for example. Silicon dioxide can be selected as second component 23, for example, in which case air can be used as first component 22. The refractive index of water lies between the refractive indices of the two components. When air is used as first component 22, the silicon dioxide, as second component 23, has cylindrical apertures, for example, having diameters smaller than the utilized light wavelengths. The drawing is by way of illustration only; the apertures can actually also have more random shapes generated, for example, by etching. The volume ratio is crucial as is the assurance that the mean aperture diameters are smaller than the light wavelengths which are utilized and which are to be detected.

A mixed material or demixed material comprising two components can also be used instead of a nanostructured material.

Further, to minimize the aberrations as far as possible it is advantageous that the thickness of the covering 12 is selected to be as small as possible. In this case, a thickness of some hundreds of micrometers is sufficient for a covering 12 configured as vessel bottom and a thickness of a few micrometers is sufficient for a covering 12 configured as a sheet and serving as a cover for the sample vessel 1.

By means of the arrangements for light sheet microscopy described above, the occurrence of contamination when changing samples can be prevented particularly within the framework of a method in which high throughput is wanted. Particularly when the illumination objective 6 and detection objective 8 are arranged below the sample vessel 1, corresponding microtiter plates with flat vessel bottoms and a plurality of wells can also be used.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

LIST OF REFERENCE NUMERALS 1 sample vessel
2 medium
3 sample
4 specimen stage
5 light source
6 illumination objective
7 optical axis
8 detection objective
9 optical axis
10 detector
11 interface/first large surface
12 covering
13 interface/second large surface
14, 15 non-axial lens
16, 17 deformable mirror
18 lens
19 deformable mirror
20, 21 beamsplitter
22 first component
23 second component

The invention claimed is:
1. An arrangement for light sheet microscopy comprising:
a sample vessel for receiving a sample that is located in a medium, the sample vessel being oriented with respect to a plane reference surface;
illumination optics with an illumination objective for illuminating the sample with a light sheet;
detection optics with a detection objective; and
a separating layer system with one or more layers of predetermined thickness and made of predetermined materials for spatially separating the medium in which the sample is found from the illumination objective and the detection objective;
wherein an optical axis of the illumination objective and the light sheet lies in a plane that forms a nonzero illumination angle $\beta$ with a normal of the reference surface;
wherein an optical axis of the detection objective forms a nonzero detection angle $\delta$ with the normal of the reference surface;
wherein, at least in a region which is accessible to the illumination objective and the detection objective for illumination and detection, the separating layer system contacts the medium with an interface that is oriented parallel to the reference surface; and
wherein the illumination angle $\beta$ and detection angle $\delta$ are predetermined based on numerical apertures $NA_D$, $NA_B$ of the detection objective and of the illumination objective, respectively;
wherein the numerical aperture $NA_B$ of the illumination objective is less than the numerical aperture $NA_D$ of the detection objective, and the illumination angle $\beta$ is greater than the detection angle $\delta$;
wherein the illumination optics, the detection optics, or both include corrective means for reducing aberrations arising as a result of the oblique passage of illumination light and/or the light to be detected through interfaces of the separating layer system;
wherein the separating layer system comprises:
a plate-shaped or sheet-shaped covering that covers the sample vessel, the plate-shaped or sheet-shaped covering comprising a predetermined material and having a predetermined thickness;
wherein a first surface of the plate-shaped or sheet-shaped covering is in contact with the medium at least in the region that is accessible to the illumination objective and detection objective for illumination and detection;
wherein a second surface of the covering is in contact with a gas or an immersion medium, as further component of the separating layer system, at least in the region that is accessible to the illumination objective and detection objective for illumination and detection;
wherein the predetermined material for the covering has a refractive index that differs by less than 5% from a refractive index of the medium in which the sample is located; and
wherein the illumination objective and the detection are arranged below the sample vessel.

2. The arrangement for light sheet microscopy according to claim 1;
wherein the corrective means includes corrective lenses, corrective elements, or both in the illumination objective and/or in the detection objective.

3. The arrangement for light sheet microscopy according to claim 2;
wherein the corrective means includes the corrective lenses; and
wherein the corrective lenses are configured as cylindrical lenses, as lenses which are tilted relative to the optical axis, as lenses which are not arranged axially, or as a some combination thereof; and
wherein the corrective elements are configured as elements with aspherical surfaces or free-form surfaces.

4. The arrangement for light sheet microscopy according to claim 1;
wherein the corrective means comprises:
adaptive optical elements that are arranged in the illumination beam path, in the detection beam path, or both for manipulating phase fronts of the illumination light, of the detection light, or of both.

5. The arrangement for light sheet microscopy according to claim 4;

wherein the adaptive optical elements comprise deformable mirrors, spatial light modulators, phase plates, or a combination thereof.

6. The arrangement for light sheet microscopy according to claim 1;
wherein the medium in which the sample is located is water; and
wherein the material for the covering comprises at least one material selected from the group consisting of polytetrafluoroethylene, amorphous non-crystaline fluoropolymers, fluorinated ethylene propylene, amorphous fluoroplastics, and perfluorodioxolane polymers.

7. The arrangement for light sheet microscopy according to claim 1;
wherein the covering comprises an amorphous polymer having a glass transition temperature such that the polymer in a cooled state has the same refractive index as the medium in which the sample is located.

8. The arrangement for light sheet microscopy according to claim 1;
wherein the material for the covering comprises a nanostructured material comprising:
a first component; and
a second component;
wherein a refractive index of the first component is less than the refractive index of the medium, and the refractive index of the second component is greater than the refractive index of the medium; and
wherein mean structure sizes of regions made from the first component have a mean diameter that is less than the light wavelengths of the light which is to be used for illumination and which is to be detected.

9. The arrangement for light sheet microscopy according to claim 1;
wherein the illumination objective and the detection objective are arranged above the sample vessel; and
wherein the sample vessel comprises a means for positioning the sample in a top one fourth of the sample vessel with respect to a depth of the sample vessel.

10. The arrangement for light sheet microscopy according to claim 1;
wherein the sum of the illumination angle $\beta$ and detection angle $\delta$ is 90°.

11. The arrangement for light sheet microscopy according to claim 1;
wherein the second surface of the covering is in contact with air, as further component of the separating layer system, at least in the region that is accessible to the illumination objective and detection objective for illumination and detection.

* * * * *